(No Model.) 3 Sheets—Sheet 1.
A. BARR & W. STROUD.
APPARATUS FOR PRODUCING HIGH VACUUMS.
No. 604,486. Patented May 24, 1898.
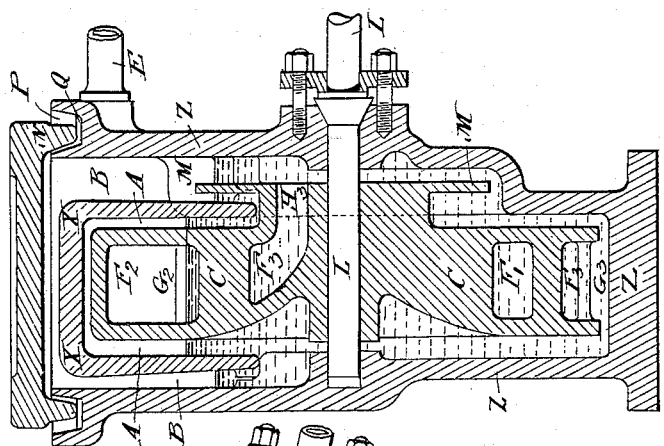
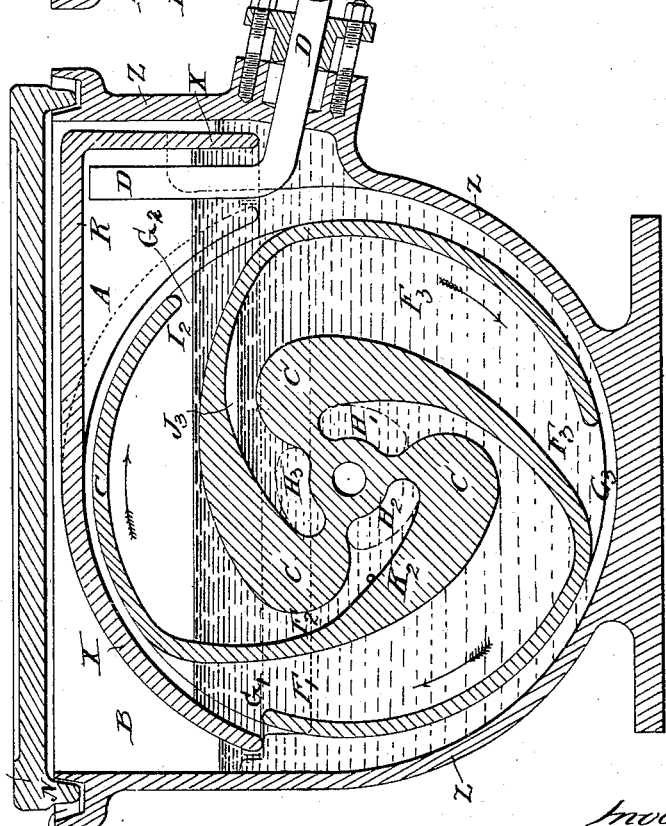
Witnesses:
Jas. W. White
Herbert Bradley
Inventors.
Archibald Barr.
William Stroud.
By Knight Bros.
Attorneys.

(No Model.) 3 Sheets—Sheet 2.
A. BARR & W. STROUD.
APPARATUS FOR PRODUCING HIGH VACUUMS.
No. 604,486. Patented May 24, 1898.
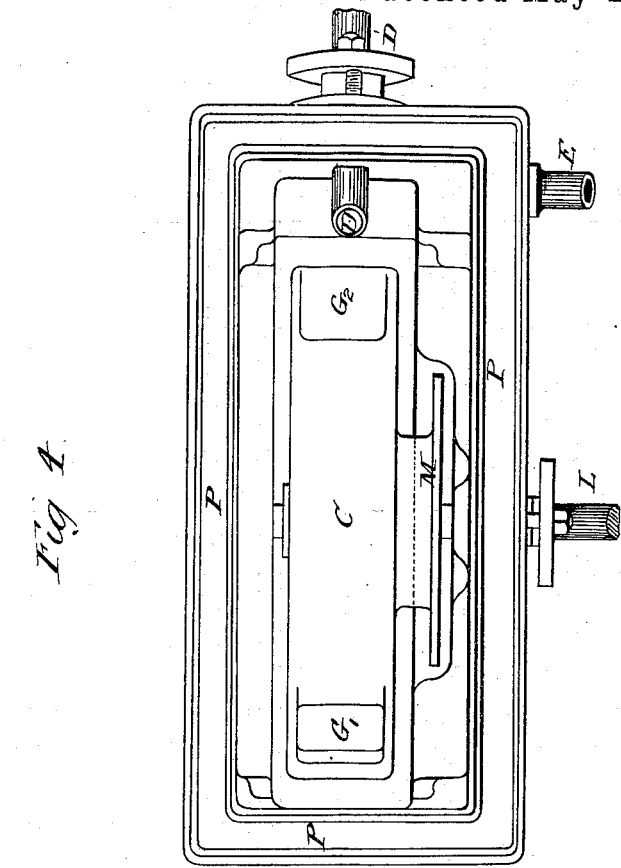
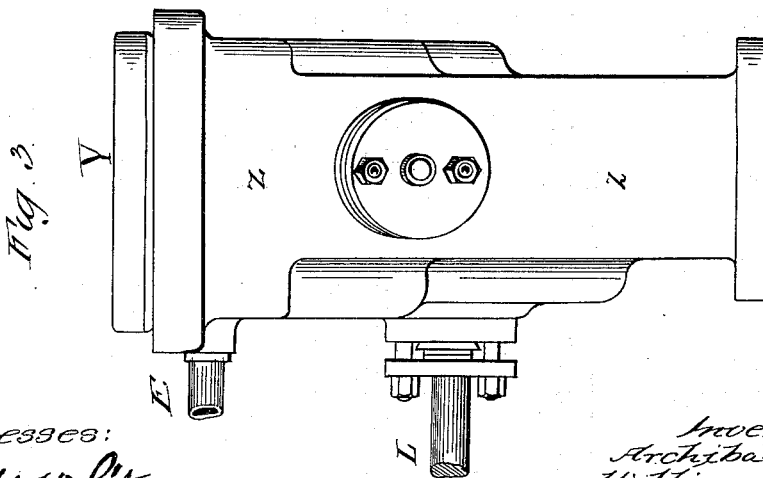

(No Model.) 3 Sheets—Sheet 3.
A. BARR & W. STROUD.
APPARATUS FOR PRODUCING HIGH VACUUMS.
No. 604,486. Patented May 24, 1898.
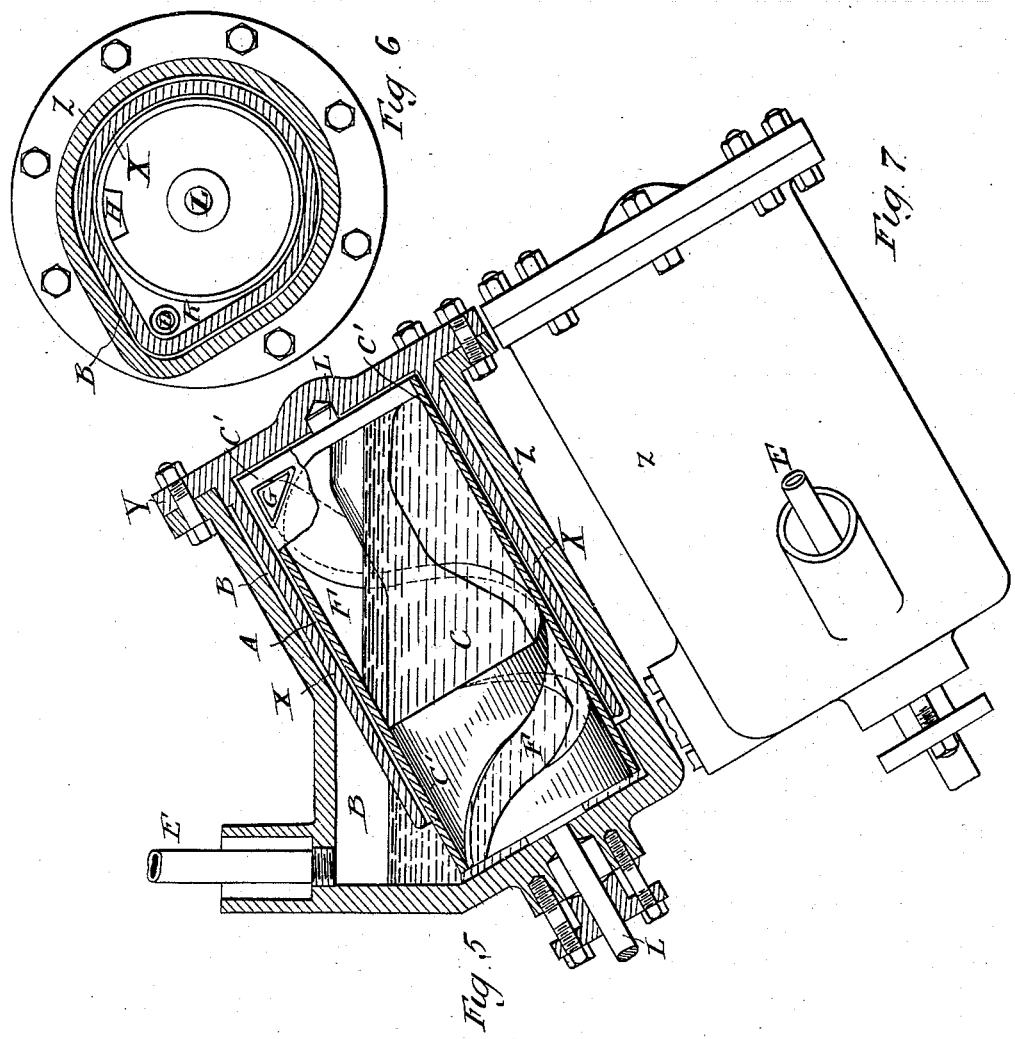
Witnesses:
Jas. W. White
Herbert Bradley
Inventors:
Archibald Barr
William Stroud
By Knight Bros
Attorneys

UNITED STATES PATENT OFFICE.

ARCHIBALD BARR, OF GLASGOW, SCOTLAND, AND WILLIAM STROUD, OF LEEDS, ENGLAND.

APPARATUS FOR PRODUCING HIGH VACUUMS.

SPECIFICATION forming part of Letters Patent No. 604,486, dated May 24, 1898.

Application filed November 19, 1896. Serial No. 612,773. (No model.)

*To all whom it may concern:*

Be it known that we, ARCHIBALD BARR, professor of engineering in the University of Glasgow, in the city of Glasgow, Scotland, and WILLIAM STROUD, professor of physics in the Yorkshire College, Leeds, England, subjects of the Queen of Great Britain and Ireland, have invented Improvements in Apparatus for the Production of High Vacua, of which the following is a specification.

The object of our invention is the provision of better means for the rapid and efficient production of high vacua.

The apparatus is specially suitable for the exhaustion of incandescent electric lamps, besides being useful for many other purposes.

Our apparatus comprises two chambers, (which we shall refer to as A and B,) one of which, A, is placed in communication with the lamp or other vessel to be exhausted, while B is the chamber into which the gas is to be passed. The chambers are partially filled with mercury, (or in some cases other liquid or liquids may be used.) Their construction is such that the mercury (or other liquid or liquids) forms a seal between the two chambers.

In the interior of the apparatus there is placed a part or drum C, which is caused to revolve about an axis. This drum C has within it a passage (or several such) which may conveniently have a somewhat helical or spiral form. These passages are so formed and disposed that at one part of the cycle a passage comes into open communication with the portion of the chamber A situated above the level of the liquid, so as to become filled with a portion of the gas contained in the chamber A. At a later period of the revolution the aperture of the passage is brought under the surface of the liquid in the chamber A, so that it becomes sealed by immersion in the liquid. The passage is further so formed and disposed that during a succeeding portion of a revolution the gas in the passage is compressed by being carried under the level of the surface of the liquid in A and ultimately ejected at the outlet-aperture of the passage into the chamber B along with a current of the liquid which moves through the passage during the revolution of the part C. At the latter part of the exhaustion, when the quantity of gas taken into the passage during the revolution is very small, it will, when compressed, become an extremely small bubble and may not be readily removed from contact with the side of the passage in C by the sweeping action of the current of liquid nor by the tendency which it possesses to rise to the surface of the liquid. The gas forming the bubble may nevertheless be prevented from again gaining access to the space to be evacuated by so constructing the passage that the bubble is, when compressed, left on a portion of the interior of the passage which is under the surface of the liquid in the passage during the whole time that the inlet-aperture of the passage is in communication with the space above the liquid surface in the chamber A. The chamber B is closed and placed in communication with a mechanical or other pump for the production of a partial vacuum in that chamber.

In order that our invention may be properly understood and readily carried into effect, we have hereunto appended two explanatory sheets of drawings, in the several figures of which corresponding parts are marked with the same letters of reference.

Figures 1 to 4 show one form of the apparatus, Fig. 1 being a sectional elevation at right angles to the axis of the rotating drum aforesaid; Fig. 2, a transverse section; Fig. 3, an end elevation, and Fig. 4 a plan with the cover Y and the cap X (to be hereinafter described) removed. Figs. 5, 6, and 7 represent an alternative form of the apparatus. Fig. 5 is a sectional elevation of the apparatus. Fig. 6 is a transverse section of the apparatus in a direction at right angles to the axle of the drum. Fig. 7 is a projection of the apparatus upon an inclined plane parallel to the axis.

The apparatus consists of four main parts—viz., first, an outer case Z, with, second, a removable cover Y; third, the rotating drum C, and, fourth, a cap X, which cap may conveniently be supported upon shelves formed in the interior of the outer case Z.

The interior of the apparatus is partially filled with mercury or other liquid, which forms a sealing between the exterior B and the interior A of the cap, the levels of the liquid during the operation of the apparatus being somewhat as shown, that of the liquid in the interior being higher than that outside. The interior of the cap thus sealed off from the exterior forms the chamber A, above referred to, and is placed in communication with the vessel to be evacuated by means of the exhaust-tube D. The upper portion of the casing Z, exterior to the cap X, forms the chamber B, which communicates by means of the pump-tube E with the pump for producing the partial vacuum.

The rotating drum C has (in the example shown) three passages of a somewhat spiral form $F'$ $F^2$ $F^3$, terminating at the periphery of the drum in the apertures $G'$ $G^2$ $G^3$ and near the axis of the drum in apertures $H'$ $H^2$ $H^3$, as shown by $H^3$ in Fig. 2 and indicated in Fig. 1 by the dot-and-dash outlines, though being on the near side of the drum they cannot properly be represented in that figure.

When the drum is rotated in the direction indicated by the arrow, it will be evident that the liquid contained in the passage $F'$ will partially flow out by the aperture $H'$ into the exterior case, while the passage $F'$ will become partially filled with gas from the chamber A. Shortly after the passage has reached the position indicated by $F^2$ in the figure its edge $I^2$ will dip beneath the surface of the liquid, and thus a volume of gas will be entrapped and separated from communication with the chamber A. During the further rotation of the drum this gas will be carried entirely under the level of the liquid and will therefore be somewhat compressed, as shown at $J^3$. After still further rotation of the drum the passage again reaches the position indicated by $F'$, when the bubble of gas will rise so as to reach the aperture $H'$ and so be ejected through that aperture into the outer chamber B. As represented in the figure, the passages are somewhat constricted in the parts in which the bubble attains its maximum immersion, so that when the liquid in the passage begins to flow outside in virtue of the aperture $G'$ rising above the level of the liquid in the chamber A the outflowing liquid will cause a greater sweeping action than it would do if the passages were not so constricted. Should the outflowing liquid fail to detach the bubble from contact with the interior of the passage, it will be evident that, since the bubble was left adhering to the wall of the passage at some such position as indicated by $K^2$, the lip of the passage $I^2$ will be submerged beneath the liquid before the pressure on the bubble is much reduced, and therefore should the bubble subsequently become detached as its pressure is reduced, so as again to find its way into the wider portion of the passage, it will only do so after the passage is sealed off from the chamber A. Consequently even though the sweep of the liquid should fail to dislodge the bubble and carry it outward through the aperture $H'$ the gas forming the bubble will not again gain access to the chamber A. It will thus be seen that when a moderately-high vacuum has been attained in the chamber A the apparatus may operate in any one of three manners—first, the bubbles may rise to the aperture H in virtue of their flotation; second, they may be swept out by the current of liquid flowing through the passages, or, third, they may be retained in the passages until by accretion with bubbles similarly entrapped they attain such magnitude that they will be removed in one or other of the two preceding ways.

The shaft L, to which the drum C is attached, is supported in suitable bearings in the outer case Z. It may be provided with a stuffing-gland or other arrangement for preventing excessive leakage into the chamber B. In the arrangement shown in the figure this shaft is provided with a conical enlargement fitting into a suitable recess in the casing Z, which arrangement may be used in lieu of a stuffing-gland.

M is a disk forming a part of the drum C, the object of which is to prevent any air which may leak past the cone-bearing or stuffing-box of the shaft L from gaining access to the chamber A. This disk may, as shown in the drawings, be made of such a size as to extend above the level of the liquid in the chamber B.

The cover Y may be provided, as shown in the figures, with a projecting edging N on its under side, which rests within a channel P, formed in the upper edge of the case Z. In the bottom of this channel there may be placed a packing-piece Q, of india-rubber or other soft material, and the channel may be filled with mercury or other liquid to further reduce the chance of leakage into the chamber B.

The cap X may be arranged to fit around the drum C with comparatively little clearance in order that the gas entrapped in the passage F of the drum at each gulp may be a considerable fraction of the total volume of the chamber A. In the arrangement shown the cap has a prolongation at R for the accommodation of the exhaust-tube D, so that when the apparatus is not in use the cover Y may be removed, then the cap X, and, if necessary, the drum C, without disturbing the exhaust-tube D or any apparatus attached thereto. Leakage at the place where the exhaust-tube D passes through the outer case may be prevented or reduced by a stuffing-gland packed with india-rubber or other suitable packing by cementing the exhaust-tube D into the outer case or by other means, as may be found convenient in different applications of the apparatus. Should any trouble arise from air leaking past the exhaust-tube D and finding its way along the surface of the exhaust-tube into the chamber A, a piece of india-rubber sheeting or other suitable material may be passed over the exhaust-tube D in the interior of the apparatus, so as to lie between the cap X and the outer case Z, and thus to divert any bubble of air into the partial vacuum B.

The outer case Z, the cover Y, the cap X, and the drum C may be constructed of glass, china, vulcanite, or other suitable non-metallic material; but they can also be conveniently constructed of iron or steel, in which case they may be further enameled with a view to secure smoothness of the interior and air-tightness.

The mode of operation of the apparatus is as follows: A partial vacuum—say down to the pressure represented by one-half-inch or one-inch head of mercury—having been produced in the outer chamber B by a mechanical pump, a water-jet pump, or other means, the drum is rotated by hand or by motive power in the direction indicated by the arrow, when the gas remaining in the chamber A and any vessels placed in communication therewith by means of the exhaust-tube D is transferred step by step in the manner described to the chamber B.

The dimensions of the apparatus are such that the liquid may stand at a height in the chamber A above the level of the liquid in the chamber B by an amount corresponding to the pressure in the chamber B, while the level in the chamber B is above the lower edge of the cap X, so as to maintain a liquid sealing between the two chambers.

Figs. 5, 6, and 7 represent an alternative form of the apparatus. Like letters in these figures and Figs. 1 to 4 refer to corresponding parts. In the example shown the drum C contains only one passage, which in this instance has a somewhat spiral form, having apertures G and H corresponding in function to the apertures previously described with reference to the preceding figures. Fig. 5 is a sectional elevation of the apparatus. Fig. 6 is a transverse section of the apparatus in a direction at right angles to the axis of the drum, while Fig. 7 is a projection of the apparatus upon an inclined plane parallel to the axis.

In Fig. 5 the drum C is represented as being formed for convenience of construction in two portions—viz., a solid piece upon the exterior of which a groove or recess of suitable form is provided, which piece is covered by a tubular portion C, shown in section, except for a small portion at the upper end, which is shown in external view in order to exhibit the inlet-aperture G. The special construction of the interior portion of the drum, which is exhibited in the drawings, may be described as consisting of a core having a disk at its upper end, from which core a spiral blade projects, the diameter of the core being still toward the upper end in order to provide a large volume above the surface of the liquid, while at the lower end the diameter of the core is increased in order to minimize the quantity of liquid—say mercury—required and further to constrict the area of the passage toward the lower aperture H in order to increase the velocity of flow of the liquid and thus to increase the scouring action.

The pump-tube E, which constitutes the communication between the chamber B and the pump producing the partial vacuum, is represented as being attached at the bottom of a pocket formed in the upper portion of the case Z, which pocket may be filled with mercury in order to prevent leakage of air past the joint. The exterior case Z and the interior cap X are represented as being for the most part cylindrical in form, but as having a protuberance or pocket R toward one side, as represented in Fig. 6, for the accommodation of the exhaust-tube D, which is carried in through a stuffing-gland and turned upward, so as to extend above the surface of the liquid in the chamber A. The operation of this modified form of the apparatus is identical in its main principle with that of the apparatus shown in Figs. 1 to 4.

It will be evident that in the first form of the apparatus the cover Y and the cap X may be formed in one piece, as the corresponding portions are in the case of the second form of apparatus described, and the details of the apparatus may be modified in many other respects, while still retaining the essential feature of our invention, which is the use in combination, with a pump producing a partial vacuum in a chamber B, of a rotating drum, which during its rotation removes from a chamber A a portion of the gas contained therein, compresses it somewhat, and ejects it into the partial vaccum in chamber B maintained by the pump aforesaid.

Having stated the nature of our invention and described the manner of performing same, we declare that what we claim is—

1. An apparatus for the production of high vacua, comprising a case having an exhaust-tube and a pump-tube and adapted to contain liquid, a cover, a cap located within the case and providing in connection therewith an inner chamber and an outer chamber sealed by the said liquid, and a rotating drum adapted to be partly submerged in the liquid and having a curved air-passage through which air is transferred from the inner chamber; substantially as described.

2. An apparatus for the production of high vacua, comprising a case, a cover, a cap located within the case and providing in connection therewith an inner chamber and an outer chamber, the exhaust-tube entering the inner chamber, the pump-tube extending from the outer chamber, and the rotating drum formed with three curved passages terminating at the periphery of the drum in apertures, and near the axis of the drum in apertures; substantially as described.

In testimony whereof we have signed our names to this specification in the presence of two witnesses.

ARCHIBALD BARR.
WILLIAM STROUD.

Witnesses as to signature of Archibald Barr:
WILLIAM G. STRANG,
HAROLD D. JACKSON.

Witnesses as to signature of William Stroud:
JAMES B. HENDERSON,
J. D. CORMACK.